United States Patent [19]

Kowalski

[11] 4,283,157
[45] Aug. 11, 1981

[54] CONNECTOR

[75] Inventor: Joseph W. Kowalski, Florissant, Mo.

[73] Assignee: B-Line Systems, Inc., Highland, Ill.

[21] Appl. No.: 81,652

[22] Filed: Oct. 4, 1979

[51] Int. Cl.³ .............................................. F16D 1/00
[52] U.S. Cl. .................................. 403/297; 403/374; 403/363
[58] Field of Search ............... 403/292, 295, 297, 402, 403/401, 367, 351, 374, 409, 363

[56] References Cited

U.S. PATENT DOCUMENTS 1,549,632   8/1925   Trester
3,900,269   8/1975   Pavlot .................................. 403/292

FOREIGN PATENT DOCUMENTS 1004571   3/1957   Fed. Rep. of Germany ........... 403/363

Primary Examiner—Andrew V. Kundrat
Attorney, Agent, or Firm—Senniger, Powers, Leavitt and Roedel

[57] ABSTRACT

A connector for a channel, the latter having a web and side flanges with inwardly turned, hook-shaped lips defining a slot therebetween. The connector comprises an elongate connecting member generally U-shaped in cross-section having a pair of side walls. The member is axially inserted inside the channel with the open side of the member toward the channel slot and the side walls of the member adjacent and parallel to the side flanges of the channel. A cam is mounted in a side wall of the member for movement from a retracted to a locking position in which the cam engages a lip of the channel when the member is inside the channel to force the member toward the web of the channel for engagement therewith thereby rigidly securing the channel to the member.

22 Claims, 11 Drawing Figures

CONNECTOR

BACKGROUND OF THE INVENTION

This invention relates generally to connectors and more particularly to a connector for a U-shaped channel.

Electrical conduit, pipes, fixtures, etc. are commonly supported overhead or vertically by channel framing conventionally having side flanges with inwardly turned, hook-shaped lips defining a slot therebetween. Heretofore, various means have been used to join sections of channel framing, but all have been disadvantageous for one reason or another. For example, one such means is a channel-shaped connector comprising two side walls and a connecting web, the latter having a pair of openings therein toward opposite ends of the web for threadably receiving two machine screws. After a pair of channels to be joined are telescoped onto opposite ends of the connector with the open side of the connector toward the channel slots and the side walls of the connector adjacent and parallel to the side flanges of the channels, the machine screws are threaded into the holes until they bear against the webs of the channels. Continued tightening of the screw moves the connector relative to the channels until the outer edges of the connector walls are jammed against the channel lips to lock the connector to the channels and thus the channels to each other. However, this type of connector presents a serious problem inasmuch as the screw heads within the connector interfere with the use of the channels as a raceway for insulated wires and cable. Moreover, the screw heads may damage the insulation.

Reference may be made to U.S. Pat. Nos. 1,549,632 and 3,900,269 which disclose connectors of the same general type as this invention.

SUMMARY OF THE INVENTION

Among the several objects of this invention may be noted the provision of an improved connector for a channel; the provision of such a connector by which a channel may be quickly and easily joined to the connector; the provision of such a connector which provides a clear channel for safely carrying a maximum number of insulated wires and cables; and the provision of such a connector which is economical to manufacture.

Briefly, an improved connector of this invention for a channel having a web and side flanges with inwardly turned lips defining a slot therebetween, comprises an elongate connecting member having a pair of side walls. The member is axially inserted in the channel with the open side of the member toward the channel slot and the side walls of the member adjacent and parallel to the side flanges of the channel.

The connector further includes cam means journaled in a side wall of the member for rotation about an axis generally perpendicular to the side walls of the member from a retracted to a locking position in which the cam means engages a lip of the channel when the member is inside the channel to force the member toward the web of the channel for engagement therewith thereby rigidly securing the channel to the member.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
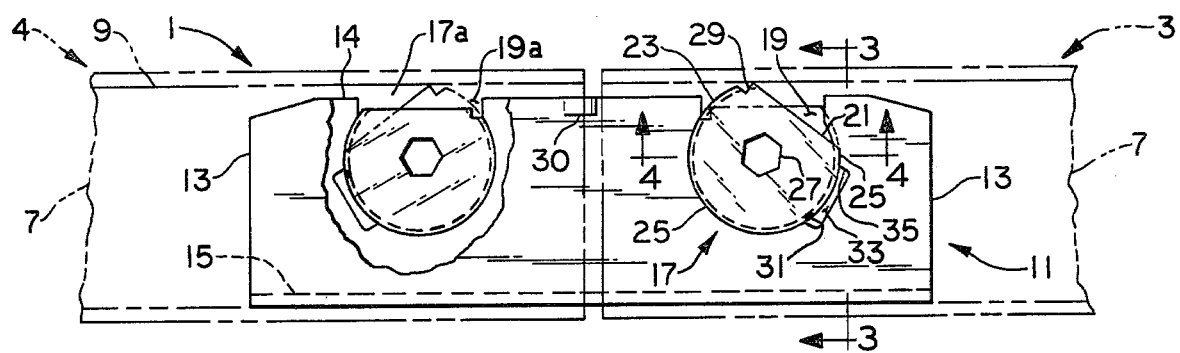
FIG. 1 is a side elevation of a pair of channels (shown in phantom) joined by a connector of this invention, portions of the latter being broken away for purposes of illustration.

Referring now to the drawings, particularly to FIG. 1, a connector of this invention is indicated in its entirety at 1 and is shown joining a pair of channels, the right channel (as viewed in FIG. 1) being generally designated 3 and the left channel generally designated 4. These channels, shown in phantom, each comprise a web 5 and a pair of side flanges 7, the outer end of which have inwardly directed lips formed thereon as indicated at 9. Each of these lips is hook-shaped for defining a groove G between the outer margin of the lip and a respective side flange 7. And the lips 9 are spaced from one another to define a slot S therebetween which extends the entire length of each channel 3, 4.

Figure 3:
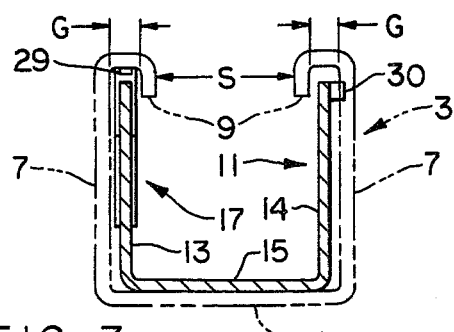
FIG. 3 is a vertical section on line 3—3 of FIG. 1.

The connector 1, which is preferably of 14 gage (about 0.075 in. or 19 mm.) hot-rolled sheet steel or other suitable material, comprises an elongate connecting member 11 generally U-shaped in cross-section, having left and right (as viewed in FIG. 3) side walls, indicated at 13 and 14, respectively, and a connecting wall 15. As shown, member 11 is sized for a relatively snug fit inside the channels 3, 4 with the open side of the member toward the channel slots S and side walls 13, 14 of the member adjacent and parallel to side flanges 7 of the channels. The outer edges of side walls 13, 14 are received in grooves G.

Indicated generally at 17 and mounted in side wall 13 of member 11 toward the right end thereof is a flat member or cam which is preferably of 11 gage (about 0.1196 in. or 3 mm.) hot-rolled sheet steel. This cam 17, hereinafter referred to as the right-hand cam 17, constitutes cam means and is journaled in a notch 19 in side wall 13 of the connecting member for rotation about an axis generally perpendicular to the side wall between a retracted position (shown in broken lines in FIG. 1) and a locking position (shown in solid lines). In the latter position, cam 17 engages the underside of lip 9 on side wall 13 of the right channel 3 to force the connecting member toward the web 5 of the channel for engagement therewith.

Figure 4:
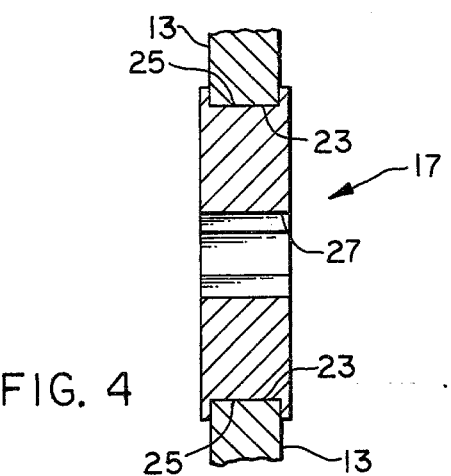
FIG. 4 is an enlarged horizontal section taken on line 4—4 of FIG. 1, illustrating details of a cam mounted in a side wall of a connecting member.

More particularly, right-hand cam 17 is part-circular in shape, having a substantially straight edge 21 and a part-circular edge 23 constituting part-circular edge means. Side wall 13 has mating part-circular edge means comprising a pair of part-circular edges, each indicated at 25, which define opposite sides of notch 19 and provide bearing surfaces for rotation of the cam 17 in notch 19. As best illustrated in FIG. 4, part-circular edge 23 of the cam 17 is generally U-shaped in cross-section for engaging opposite faces of side wall 13 of the connecting member to hold the cam captive in notch 19. A central hole 27 in the right-hand cam 17 is provided for receiving an Allen wrench or the like to rotate the cam.

When the right-hand cam is in its aforementioned retracted position, the straight edge 21 of the cam is generally collinear with the outer edge of the side wall 13 of the connecting member. But on clockwise rotation of this cam to its locking position, that edge 21, constituting a camming surface assumes a generally angled position with respect to the outer edge of side wall 13 for projecting into groove G and engaging the underside of lip 9. Formed in the periphery of the right-hand cam 17 adjacent the straight edge 21 thereof are a series of teeth 29 constituting means for biting into lip 9 when the cam is turned to its locking position. The biting action not only provides a strong grip between the connecting member and the channel but insures a good electrical connection between the two metal parts. As viewed in FIG. 1, these teeth 29 are at the left end of straight edge 21 of the right-hand cam so that when that cam is in its locking position, any force tending to pull channel 3 to the right off connecting member 11 will cause the cam to rotate further in the clockwise direction and the teeth to bite even more deeply into the channel lip 9. Movement of the channel 3 to the left on the connecting member 11 is prevented by the abutment of the left end of that channel against an ear 30 projecting laterally from side wall 14 (see FIG. 2).

Figures 2, 5, 11:
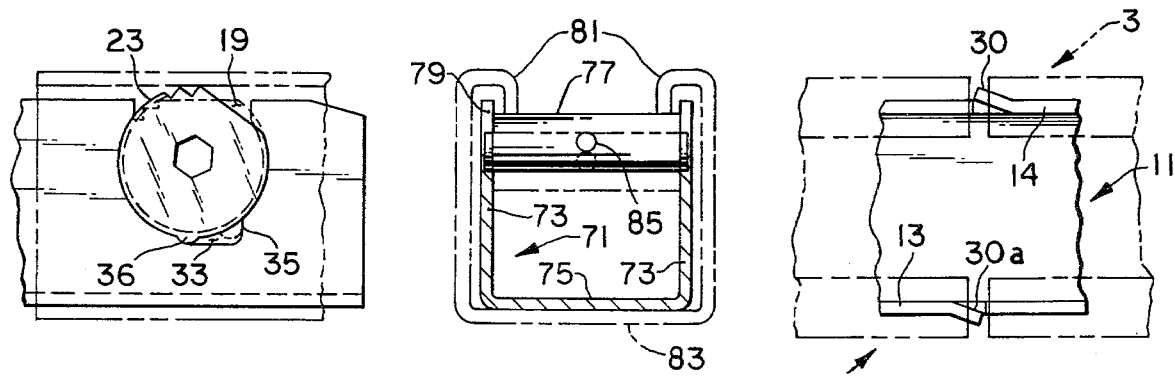
FIG. 2 is a partial plan of FIG. 1.
FIG. 5 is a side elevation of a portion of a connector similar to that shown in FIGS. 1-4, illustrating an alternative means for limiting rotation of the cam.
FIG. 11 is a vertical section on line 11—11 of FIG. 10.

For limiting rotation of the cam to rotation between its retracted and locking positions, the part-circular edge 23 is subjected to a staking operation, for example, as indicated at 31. This deformed portion 31 of edge 23 is movable in an extension 33 of the notch 19 and constitutes stop means inasmuch as it is engageable with edge 35 (constituting edge means) of side wall 13 bounding the extension 33 of the notch 19 when the right-hand cam 17 is rotated to its retracted and locking positions for limiting rotation of the cam. An alternative way of limiting rotation of the cam is shown in FIG. 5. There a finger 36 is shown projecting radially from the part-circular edge 23 of right-hand cam 17 into extension 33 of notch 19 for engagement with edge 35 to limit rotation of the cam.

Mounted in the opposite side wall 14 of connecting member 11 and toward the opposite (left) end thereof is a second, left-hand cam, generally designated by the reference numeral 17a, identical in construction to the right-hand cam heretofore described and also constituting cam means. This left-hand cam 17a is journaled in a notch 19a (similar to notch 19 previously described) for counterclockwise rotation from a retracted position (shown in solid lines) to a locking position (shown in phantom) in which the cam 17a engages the underside of lip 9 of side wall 14 of the left channel 4 to force the connecting member 11 toward the web 5 of that channel for engagement therewith. Although the left and right-hand cams 17, 17a are shown mounted in opposite side walls of the connecting member 11, it shall be understood that both suitably could be mounted in the same side wall.

In accordance with this invention, the connector 1 may be used quickly and easily to join the two channels 3, 4 shown in FIG. 1. Thus, with the right-hand cam 17 in its retracted position in which straight edge 21 is generally collinear with the outer edge of side wall 13 of the connecting member 11, the right end of the latter is axially inserted or slid inside the right channel 3 with the open side of the connecting member toward the channel slot S and the outer edges of side walls 13, 14 of the member in grooves G formed by the hook-shaped lips 9. The connecting member is slid into channel 3 until ear 30 abuts the left end of that channel, the ear thus constituting abutment means for preventing further movement of the member into the channel. The left end of the connecting member is slid inside the left channel 4 in the same fashion until ear 30a abuts the right end of channel 4. To facilitate inserting member 11 inside the channels, the upper edges of side walls 13, 14 are beveled at opposite ends of the member.

With channels 3 and 4 telescoped on opposite ends of the connecting member 11 and abutting ears 30, 30a as shown in FIGS. 1 and 2, the right and left-hand cams 17, 17a are rotated in clockwise and counterclockwise directions, respectively, from retracted to locking positions in which they engage a respective lip 9 of each channel 3, 4 to force connecting member 11 toward the webs 5 of the channels until the connecting wall 15 of the member is clamped against webs 5 thereby rigidly to secure channels 3, 4 to the connecting member and thus the channels to each other.

In view of the foregoing it will be apparent that connector 1 of this invention readily establishes a rigid connection between a pair of channels. Moreover, the connector leaves the connected channels entirely clear for carrying an increased number of conductors therein. And the simple design of the connector enables economical manufacture thereof.

Figure 6:
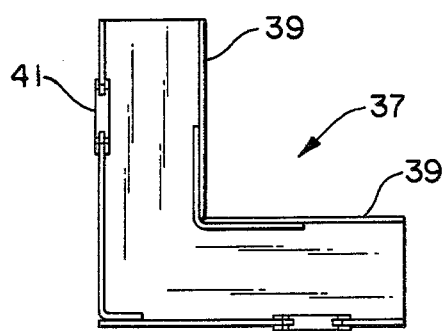
FIGS. 6-9 are plans of alternative connectors comprising connecting members of various shapes, each having mounted therein cams identical to the cam shown in FIGS. 1-4.
Figure 7:
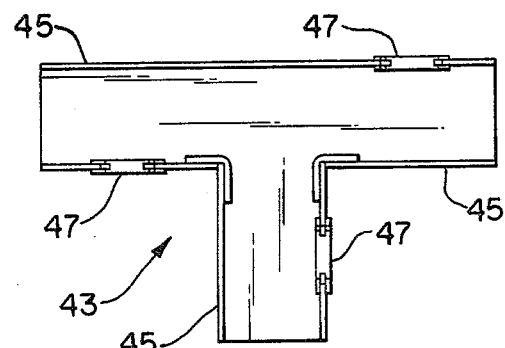
Figure 8:
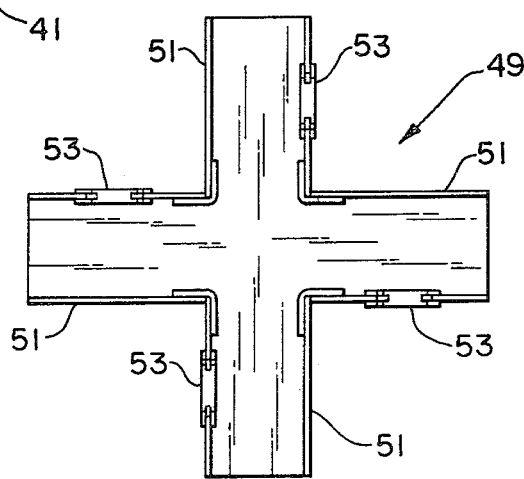

Although the connector 1 described above is designed only for straight splices, it will be understood that connectors of other configurations for different applications also fall within the scope of this invention. FIG. 6, for example, illustrates a generally L-shaped connector 37 having two legs, each designated 39, for orthogonally joining a pair of channels. Mounted in the side walls of these legs are cams, each indicated at 41, identical in structure and operation to cams 17 and 17a heretofore described. For rigidly joining three channels, FIG. 7 shows a generally T-shaped connector 43 having three legs, each indicated at 45. Indicated at 47 and mounted in the side walls of the legs 45 are cams, also identical in structure and operation to cams 17 and 17a described hereinabove. And for joining four connectors, a generally cross-shaped connector is indicated generally at 49 in FIG. 8. This connector has four legs 51 having cams 53 mounted in the side walls thereof. These cams 53 are also identical to cams 17 and 17a.

Figure 9:
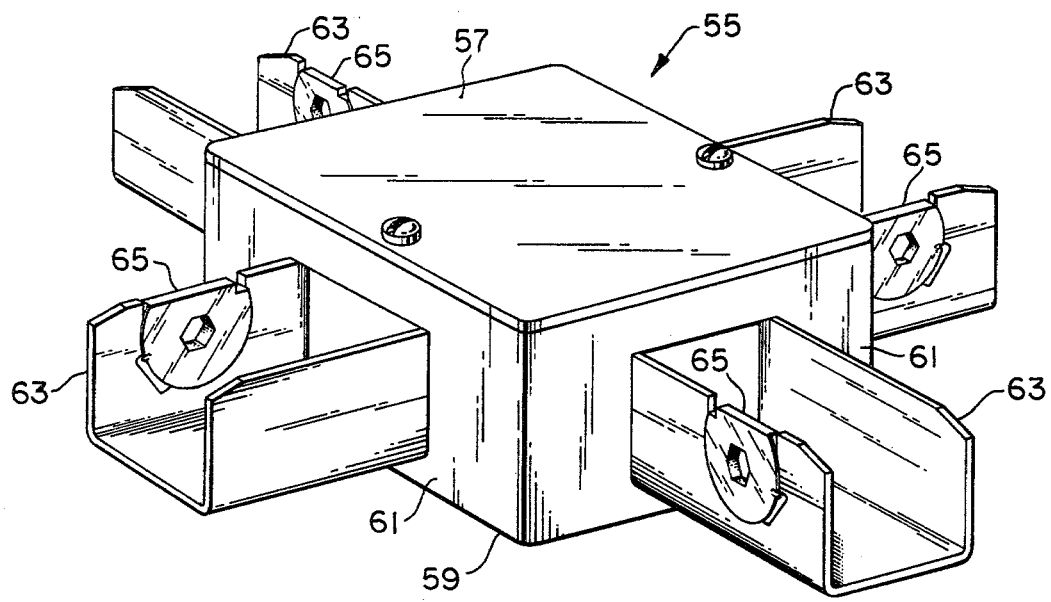

Still another application of the connector of this invention is illustrated in FIG. 9 where an electrical junction box, generally indicated at 55, is shown to comprise a top 57, a bottom 59 and sides 61. Projecting outwardly from each side 61 of the box is a U-shaped connecting member 63 having journaled in one side wall thereof a cam 65 identical in structure and operation to cam 17 described previously.

Figure 10:
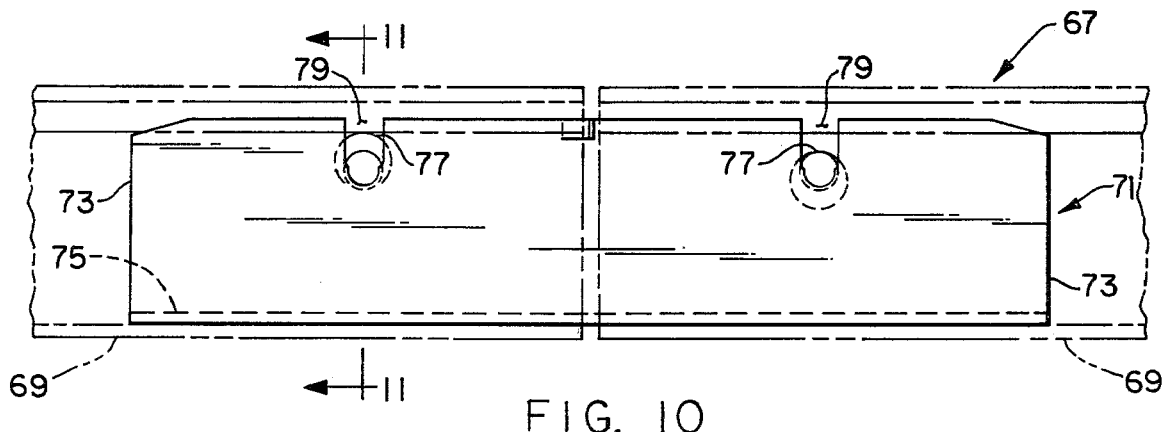
FIG. 10 is a plan of another connector of this invention comprising a connecting member and an alternative cam.

Referring now to FIGS. 10 and 11, another connector of this invention is indicated generally at 67 and is shown joining a pair of channels 69 (shown in phantom and identical to the channels 3, 4 shown in FIGS. 1 and 2) telescoped onto opposite ends of the connector. The connector comprises a generally U-shaped connecting member 71 having a pair of side walls, each indicated at 73, and a connecting wall 75. A pair of elongate roller cams each designated 77 and preferably of cold-rolled steel, extend between the side walls 73 of the connecting member toward opposite ends of the member. The ends of each roller cam 77 are journaled in elongate, open-ended slots 79 in the upper margins of the side walls for rotation of the roller cam about an axis generally perpendicular to the side walls.

In accordance with this invention, the roller cams 77 are eccentric, the central longitudinal axis of each cam being offset from its axis of rotation. Thus, on rotation of the roller cams 77 (either clockwise or counterclockwise), they move from a retracted position (shown in phantom in FIG. 11) to a locking position (shown in solid lines). In this latter position, "the outer cylindrical surfaces of the roller cams, which surfaces constitute camming surfaces extending axially from one side wall of the connecting member to the other," engage the lips 81 of each channel 69 thereby to force connecting member 71 toward the webs 83 of channels 69 until connecting wall 75 of the member 71 clamps firmly against the webs 83 thereby rigidly to secure the channels to the connecting member and thus the channels to each other.

The edges of side walls 73 bounding slots 79 may be peened to ensure that the ends of the roller cams are held captive in the slots. A hole 85 is provided through each roller cam 77 for rotating the cam between the aforesaid retracted and locking positions.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector in combination with a channel having a web and side flanges with inwardly turned lips defining a slot therebetween, said connector comprising, an elongate connecting member having a pair of side walls, said member being axially inserted inside the channel with an open side of the member toward the channel slot and the side walls of the member adjacent and parallel to the side flanges of the channel, and cam means mounted in at least one side wall of the member for movement from a retracted position to a locking position in which, with the member inside the channel, the cam means engages a lip of the channel to force the member toward the web of the channel for engagement therewith thereby rigidly to secure the channel to the member.

2. A connector as set forth in claim 1 wherein said cam means is journaled in said side wall for rotation about an axis generally perpendicular to the side wall.

3. A connector as set forth in claim 1 wherein said connecting member is generally U-shaped in cross-section.

4. A connector for a channel having a web and side flanges with inwardly turned lips defining a slot therebetween, said connector comprising, an elongate connecting member having a pair of side walls, said member being adapted to be axially inserted inside the channel with the open side of the member toward the channel slot and the side walls of the member adjacent and parallel to the side flanges of the channel;

cam means mounted in at least one side wall of the member for movement from a retracted position to a locking position in which the cam means engages a lip of the channel when the member is inside the channel to force the member toward the web of the channel for engagement therewith thereby rigidly to secure the channel to the member; and abutment means on the connecting member for engagement by an end of the channel on insertion of the member inside that end of the channel to prevent further movement of the member into the channel.

5. A connector as set forth in claim 2 wherein said cam means has a central opening therein for receiving a tool to rotate the cam means between said retracted and locking positions.

6. A connector for a channel having a web and side flanges with inwardly turned lips defining a slot therebetween, said connector comprising, an elongate connecting member having a pair of side walls, said member being adapted to be axially inserted inside the channel with the open side of the member toward the channel slot and the side walls of the member adjacent and parallel to the side flanges of the channel, and cam means journaled in at least one side wall of the member for rotation about an axis generally perpendicular to the side wall from a retracted position to a locking position in which the cam means engages a lip of the channel when the member is inside the channel to force the member toward the web of the channel for engagement therewith thereby rigidly to secure the channel to the member, said cam means comprising a flat member having part-circular edge means mounted in a notch in said side wall, the latter having mating part-circular edge means.

7. A connector as set forth in claim 6 wherein an edge of said flat member is substantially straight, said edge being generally colinear with the outer edge of said wall when the flat member is in said retracted position and angled with respect to the outer edge of the side wall for engagement with a lip of said channel when the flat member is in said locking position.

8. A connector as set forth in claim 6 wherein said flat member has means thereon for biting into a lip of the channel to lock the flat member in said locking position.

9. A connector as set forth in claim 6 wherein said flat member has stop means interengageable with said side wall of the connecting member for limiting rotation of the flat member to rotation between said retracted and locking positions.

10. A connector as set forth in claim 9 wherein said stop means comprises a deformed portion of said part-circular edge means of the flat member, said portion being movable in an extension of said notch and engageable with edge means of said side wall bounding said extension of the notch when the cam is rotated to its locking and retracted positions for limiting rotation of the flat member.

11. A connector as set forth in claim 9 wherein said stop means comprises a finger projecting radially from said part-circular edge means of the flat member, said finger being movable in an extension of said notch and engageable with edge means of said side wall bounding said extension of the notch when the flat member is rotated to its retracted and locking positions for limiting said rotation of the flat member.

12. A connector as set forth in claim 6 wherein a flat member is mounted toward each end of the connecting member for rigidly joining a pair of channels on opposite ends of the member.

13. A connector as set forth in claim 12 wherein said flat members are mounted in opposite side walls of the connecting member.

14. A connector as set forth in claim 2 wherein said cam means comprises an elongate roller cam extending between said side walls of the connecting member and having its ends journaled in said side walls.

15. A connector as set forth in claim 14 wherein the central longitudinal axis of said roller cam is offset from said axis of rotation for allowing the roller cam to move between said retracted and locking positions.

16. A connector as set forth in claim 14 wherein one of said roller cams is mounted toward each end of the connecting member for rigidly joining a pair of channels on opposite ends of the connecting member.

17. For rigidly joining a pair of channels, a connector as set forth in claim 1 wherein said connecting member is generally L-shaped, having two legs, each of which has said cam means mounted in a side wall thereof.

18. For rigidly joining three channels, a connector as set forth in claim 1 wherein said connecting member is generally T-shaped, having three legs, each of which has said cam means mounted in a side wall thereof.

19. For rigidly joining four channels, a connector as set forth in claim 1 wherein said connecting member is generally cross-shaped, having four legs, each of which has said cam means mounted in a side wall thereof.

20. A connector as set forth in claim 1 for connecting said channel and a junction box having a top, bottom and sides wherein said connecting member projects outwardly from a side of the junction box.

21. A connector for a channel having a web and side flanges with inwardly turned lips defining a slot therebetween, said connector comprising:

an elongate connecting member having a pair of side walls, said member being adapted to be axially inserted inside the channel with an open side of the member toward the channel slot and the side walls of the member adjacent and parallel to the side flanges of the channel; and elongate cam means rotatably mounted in the side walls of the member and having a radially eccentric camming surface extending axially from one side wall of the member to the other side wall of the member, said cam means being rotatable from a retracted position to a locking position in which said camming surface engages the lips of the channel to force the connecting member toward the web of the channel for engagement therewith thereby rigidly to secure the channel to the member.

22. A connector as set forth in claim 21 wherein said cam means has camming surfaces on opposite sides of the connecting member adjacent the side walls of the member engageable with the inturned lips of the channel when said cam means is moved to its locking position.

* * * * *